United States Patent
Müller et al.

(10) Patent No.: US 12,199,301 B2
(45) Date of Patent: Jan. 14, 2025

(54) DRIVE BATTERY

(71) Applicant: Dr. Ing. h.c. F. Porsche Aktiengesellschaft, Stuttgart (DE)

(72) Inventors: Maximilian Müller, Leonberg (DE); Ralf Keller, Pforzheim (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 242 days.

(21) Appl. No.: 17/522,014

(22) Filed: Nov. 9, 2021

(65) Prior Publication Data

US 2022/0149475 A1    May 12, 2022

(30) Foreign Application Priority Data

Nov. 10, 2020    (DE) .................... 10 2020 129 566.9

(51) Int. Cl.
| | |
|---|---|
| *H01M 50/293* | (2021.01) |
| *B60L 50/64* | (2019.01) |
| *H01M 50/204* | (2021.01) |
| *H01M 50/249* | (2021.01) |
| *H01M 50/271* | (2021.01) |

(52) U.S. Cl.
CPC .......... *H01M 50/293* (2021.01); *B60L 50/64* (2019.02); *H01M 50/204* (2021.01); *H01M 50/249* (2021.01); *H01M 50/271* (2021.01); *H01M 2220/20* (2013.01)

(58) Field of Classification Search
CPC ... B60L 50/64; H01M 50/293; H01M 50/204; H01M 50/249; H01M 50/271; H01M 50/209; H01M 50/278; H01M 50/273; H01M 50/291; H01M 50/244; H01M 2220/20; H01M 50/289; Y02E 60/10; Y02T 10/70
See application file for complete search history.

(56) References Cited

U.S. PATENT DOCUMENTS

| | | | | |
|---|---|---|---|---|
| 2012/0312615 | A1* | 12/2012 | Rawlinson | H01M 10/6557 180/68.5 |
| 2019/0229311 | A1* | 7/2019 | Günther | H01M 50/271 |
| 2019/0237720 | A1* | 8/2019 | Lucchesi | B60K 1/04 |
| 2021/0151818 | A1* | 5/2021 | Becker | H01M 10/6556 |

FOREIGN PATENT DOCUMENTS

| | | | | |
|---|---|---|---|---|
| CN | 105024030 | A | 11/2015 | |
| DE | 3228328 | * | 2/1984 | ............ H01M 10/16 |
| DE | 3228328 | A1 | 2/1984 | |
| EP | 0590357 | A1 | 4/1994 | |
| WO | 2011082226 | A2 | 7/2011 | |
| WO | WO2019/197338 | * | 10/2019 | .............. H01M 2/10 |

OTHER PUBLICATIONS

English Translation of DE3228328.*

* cited by examiner

*Primary Examiner* — Kiran Quraishi Akhtar

(74) *Attorney, Agent, or Firm* — Buchanan Ingersoll & Rooney PC

(57) ABSTRACT

A drive battery for a vehicle, in particular a motor vehicle, includes a housing, which has a plurality of partial regions, wherein one or more cell modules are respectively arranged in a first partial region and in a second partial region. A composite component is arranged between the first partial region and the second partial region in order to separate the partial regions. The composite component has a profile element of fiber-reinforced plastic, a foam body of a compressible foam and/or a silicone mat.

13 Claims, 1 Drawing Sheet

DRIVE BATTERY

CROSS-REFERENCE TO RELATED APPLICATION

This application claims priority to German Patent Application No. 10 2020 129 566.9, filed Nov. 10, 2020, the content of such application being incorporated by reference herein in its entirety.

FIELD OF THE INVENTION

The invention relates to a drive battery for a vehicle.

BACKGROUND OF THE INVENTION

CN 105024030, which is incorporated by reference herein, discloses a composite rib for the glass-fiber partition plate of a battery, wherein the rib contains a foaming agent. DE 32 28 328 A1, which is also incorporated by reference herein, discloses a multiple-cell rechargeable lead-acid battery, which has a cavity filled with foam.

SUMMARY OF THE INVENTION

The drive battery described herein is used for a vehicle, in particular for a motor vehicle. The drive battery has a housing, which has a plurality of partial regions. One or more cell modules are respectively arranged in a first partial region and in a second partial region. A composite component is arranged between the first partial region and the second partial region in order to separate the partial regions. The composite component has a profile element of fiber-reinforced plastic, a foam body of a compressible foam and/or a silicone mat.

This makes it possible to achieve a refractory and/or gastight separation of the various partial regions of the battery. Such a separation considerably improves the situation in the event of a fault of an outgassing cell. The short-circuit resistance in the event of outgassing of a cell can be optimized.

The drive battery or traction battery stores electrical energy by electrochemical means. This may be a rechargeable battery, which can receive electrical energy (charging) and release it (discharging).

The drive battery may be in the form of a lithium battery or rechargeable lithium battery. These may optionally be in the form of LiX batteries or rechargeable LiX batteries and comprise at least one further constituent (X) (configuration for example as a rechargeable lithium-ion battery, rechargeable lithium-polymer battery, or the like).

As explained above, one or more cell modules may be respectively arranged, for example arranged in series in an adjacent arrangement in relation to one another, in each partial region of the drive battery. The cell modules can be electrically connected to one another via electrical connections or electrical lines. Optionally, the cell modules can be connected in terms of flow to a cooling channel (for example a liquid cooling system) that carries a cooling medium. The cell modules can have one or more cells (for example pouch cells), which are accommodated in a cell module housing. The individual cell modules may (depending on the number of cells) have an electrical voltage of approximately 40 to 100 volts.

The composite component may extend along the intermediate space between the partial regions of the drive battery through the interior space of the housing. The composite component may be matched to the interior space of the housing of the drive battery in terms of its dimensioning and have a length of approximately 1200 mm (millimeters), for example, in particular a length of 1000 mm to 1400 mm.

The housing of the drive battery may have a frame and casing elements connected to the frame or fastened to the frame. The frame may have a plurality of frame elements, in particular frame beams, which as a whole form the frame. The housing may have a (plate-shaped or trough-shaped) battery base and/or a (plate-shaped or trough-shaped) battery cover as casing elements. The battery cover may be fastenable or fastened to the battery base and/or to the frame.

The profile element may be in the form of a hollow profile, for example with a rectangular or square cross section.

A frame element (for example a frame beam) may preferably be arranged between the two partial regions, wherein the profile element extends in a manner adjoining the frame element in a longitudinal direction and is clipped to the frame element (by means of clips). In this way, a structurally simple and stable fastening of the profile element to the frame element is provided. A fastening operation by clipping is advantageous for an automated assembly of the drive battery.

Irrespective of this, the frame element, the profile element and the foam body may form a wall or barrier between the two partial regions of the drive battery.

The profile element may preferably be formed from glass-fiber reinforced plastic. In this way, a comparatively light and nevertheless stable configuration of the profile element can be achieved. The profile element consists of plastic and glass fibers, wherein the proportion of glass fibers can amount to at least 30 percent. The profile element may be formed in such a way that it is heat-resistant, in particular up to a temperature of 1000° C. (degrees Celsius).

The foam body may preferably extend in a manner adjoining the profile element in a longitudinal direction and be fastened to the profile element. As a result, the alignment and the arrangement of the foam body inside the housing of the drive battery are predefined. The foam body may be matched to the interior space of the housing of the drive battery in terms of its dimensioning. The foam body may correspond to the frame element (for example frame beam) in terms of its length and have a length of approximately 1200 mm (millimeters), for example, in particular a length of 1000 mm to 1400 mm.

The foam body may preferably be adhesively bonded to the profile element. This makes it possible to achieve a simple and stable fastening of the foam body to the profile element. Such a fastening is advantageous moreover for the automatability of assembly of the drive battery. Irrespective of this, the foam body may be formed from compressible foam, which is heat-resistant up to 1000° C. (degrees Celsius).

As already specified, the housing may have a cover (battery cover), wherein the foam body is arranged between the profile element and the battery cover and is formed in such a way that the foam body is compressed by the cover. In other words, the foam body is compressed between the profile element and the cover when the cover is placed onto the battery housing. This makes it possible to achieve sufficient sealing between the various partial regions of the drive battery. With respect to the foam body, "formed in such a way" can mean that the foam body is configured in terms of its material properties and/or dimensioned in terms of its size in such a way that the foam body can be compressed by placing the cover on and contributes to a refractory and/or gastight separation of the partial regions of the drive battery.

The silicone mat may preferably be fastened to the foam body and, proceeding from the foam body, extends across the cell modules (at least to some extent). This contributes to a gastight separation of the partial regions. The silicone mat may extend along (for example parallel to) the surface of the cell modules and/or the cover (battery cover). The silicone mat may be beveled at the free end (silicone mat tapers away from the cover (battery cover)). If one of the cell modules outgasses, the silicone mat can bear against the inner side of the cover (battery cover) with its free end (free end of the silicone mat swivels toward the cover). This produces a sealing action.

The silicone mat may preferably be adhesively bonded to the foam body. This makes it possible to achieve a structurally simple and stable fastening of the silicone mat to the foam body.

Also described herein is a vehicle, in particular a motor vehicle, having the aforementioned drive battery. In terms of the advantages that can be achieved in this way, reference should be made to the comments in this respect that relate to the drive battery.

The vehicle, in particular motor vehicle, may have an electrical or partially electrical drive. The drive may comprise an electrical machine, a transmission driven thereby and a differential, driven in particular by the transmission. The differential may be coupled to drive wheels of the vehicle by means of drive shafts, for example.

The measures described in connection with the drive battery or still to be explained below may serve for the further refinement of the vehicle.

BRIEF DESCRIPTION OF THE DRAWINGS

Further advantageous refinements emerge from the following description and the drawing. In the drawing.

DETAILED DESCRIPTION OF THE INVENTION

Figure 1:
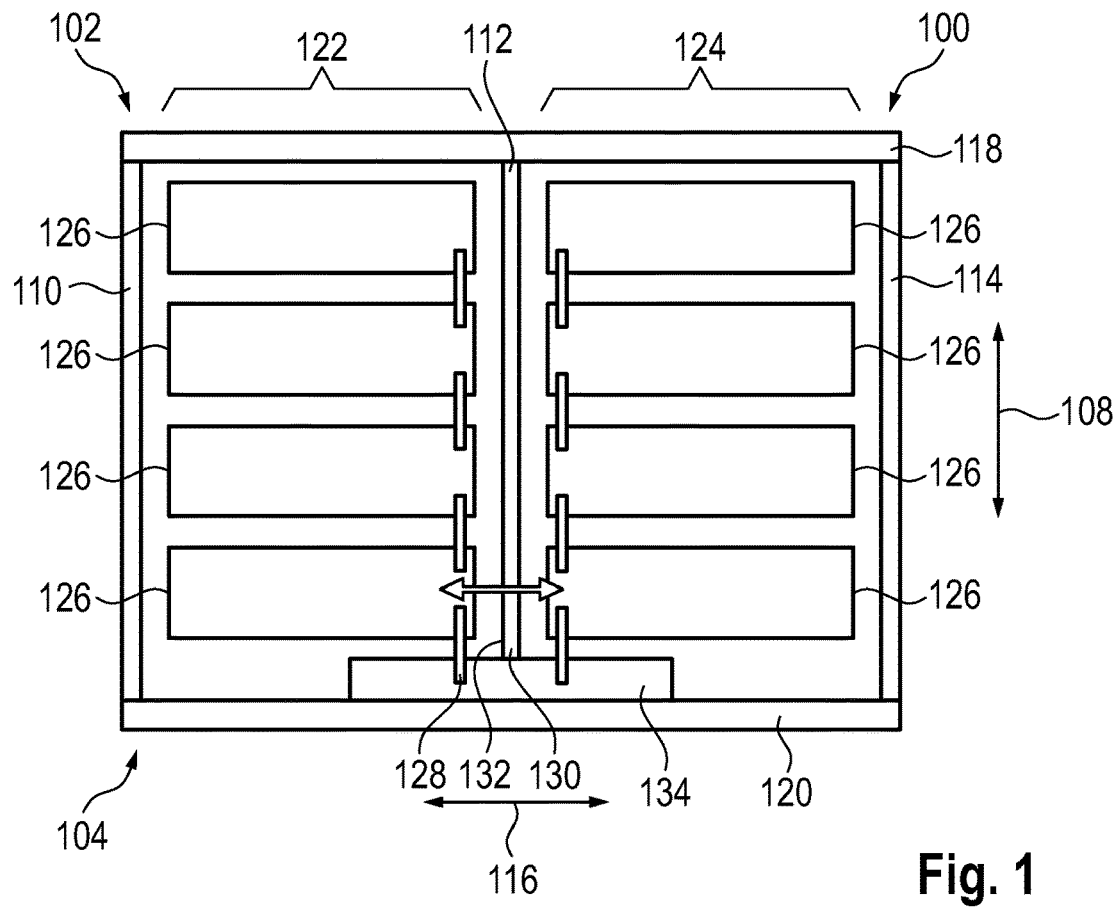
FIG. 1 schematically shows a longitudinal section through a drive battery.

FIG. 1 schematically illustrates a longitudinal section through a drive battery 100.

Figure 2:
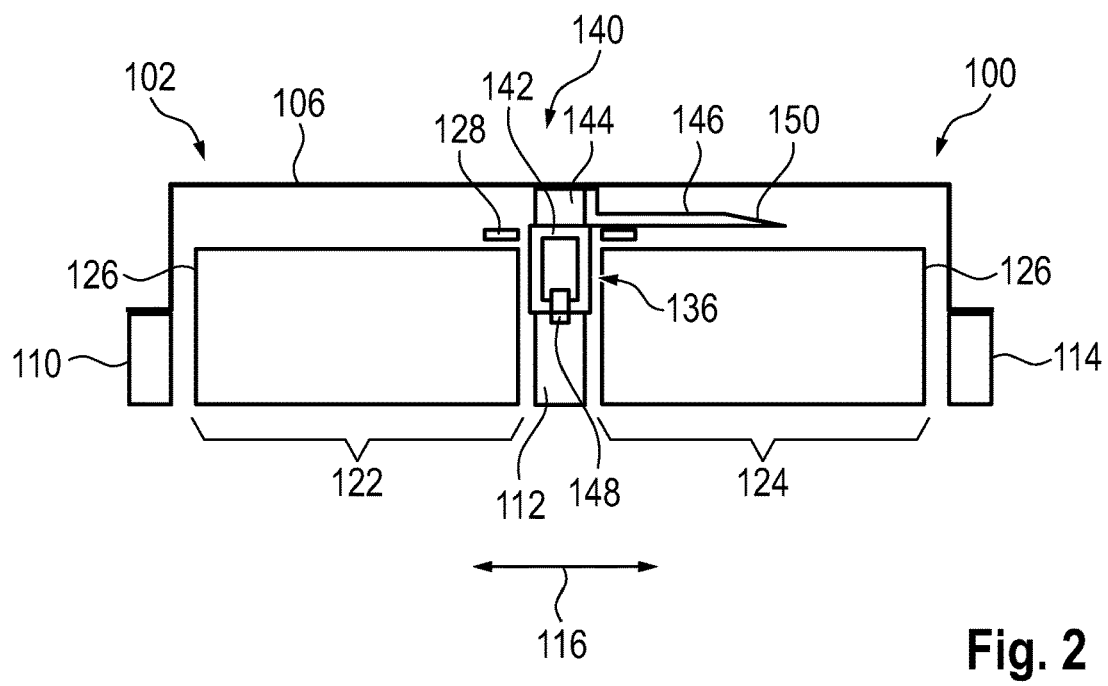
FIG. 2 schematically shows a cross section through the drive battery.

The drive battery 100 has a housing 102, of which a frame 104 and casing elements in the form of a battery base (not shown) and a battery cover (106) are part (cf. FIG. 2). The frame 104 has three frame beams 110, 112, 114 oriented in a longitudinal direction 108 (longitudinal beams) and two frame beams 118, 120 oriented in a transverse direction 116 (transverse beams) (cf. FIG. 1). The frame beams 110, 112, 114 are connected at a respective end to the frame beams 118, 120.

The drive battery 100 has a first partial region 122 and a second partial region 124, wherein a plurality of cell modules 126, in the example four respective cell modules 126, are arranged in each of the partial regions 122, 124 (cf. FIG. 1). The cell modules 126 are electrically connected to one another via electrical lines 128. In the example, the cell modules 126 are connected in terms of flow to a cooling channel 132 (in the form of a liquid cooling system in the example) that carries a cooling medium 130. The cooling channel 132 may be integrated in the frame beam 112, for example.

The drive battery 100 may have a connecting region 134, in which electrical connections and/or cooling connections are arranged (not shown). The electrical lines 128 may be connected to the electrical connections. The cooling channel 132 may be connected to the cooling connections.

A composite component 140 is arranged between the first partial region 122 and the second partial region 124 in order to separate the partial regions 122, 124 (only shown in FIG. 2). The composite component 140 has a profile element 142 of fiber-reinforced plastic, a foam body 144 of a compressible foam and a silicone mat 146.

The composite component 140 extends along the intermediate space 136 between the partial regions 122, 124 of the drive battery 100 through the interior space of the housing 102. The composite component 140 is matched to the interior space of the housing 102 of the drive battery 100 in terms of its dimensioning.

As already specified, a frame element in the form of a frame beam 112 is arranged between the two partial regions 122, 124, wherein the profile element 142 extends in a manner adjoining the frame element 112 in the longitudinal direction 108 and is clipped to the frame element 112 by means of clips 148 (cf. FIG. 2).

The frame element 112, the profile element 142 and the foam body 144 form a wall or barrier between the two partial regions 122, 124 of the drive battery 100.

The profile element 142 is formed from glass-fiber reinforced plastic, wherein the proportion of glass fibers can amount to at least 30 percent. The profile element 142 is formed in such a way that it is heat-resistant, in particular up to a temperature of 1000° C. (degrees Celsius). In the example, the profile element 142 is in the form of a hollow profile with a rectangular cross section.

The foam body 144 extends in a manner adjoining the profile element 142 in the longitudinal direction 108 and is fastened to the profile element 142. The foam body 144 is matched to the interior space of the housing 102 of the drive battery 100 in terms of its dimensioning. The foam body 144 may correspond to the frame element 112 in terms of its length. In the example, the foam body 144 is adhesively bonded to the profile element 142.

As already specified, the housing 102 has a cover or battery cover 106 (cf. FIG. 2), wherein the foam body 144 is arranged between the profile element 142 and the battery cover 106 and is formed in such a way that the foam body 144 is compressed by the cover 106. In other words, the foam body 144 is compressed between the profile element 106 and the cover 106 when the cover 106 is placed onto the battery housing 102.

The silicone mat 146 is fastened to the foam body 144 and, proceeding from the foam body 144, extends across the cell modules 126 to some extent (cf. FIG. 2). The silicone mat 146 extends along (for example parallel to) the surface of the cell modules 126 and/or the cover or battery cover 106. In the example, the silicone mat 146 is beveled at the free end 150 (silicone mat 146 tapers away from the cover or battery cover 106). In the example, the silicone mat 146 is adhesively bonded to the foam body 144.

What is claimed is:
1. A drive battery for a motor vehicle, said drive battery comprising:
a housing having a top cover and a plurality of partial regions,
one or more cell modules respectively arranged in a first partial region and in a second partial region of said plurality of partial regions, a composite component that is separate from the housing and arranged between the first partial region and the second partial region in order to separate the first and second partial regions, wherein the composite component includes (i) a hollow profile element of fiber-reinforced plastic, (ii) a foam body of a compressible foam, and (iii) a mat, wherein the foam body is positioned between the hollow profile element and the top cover and is positioned for compressive contact against an underside of the top cover of the drive battery and comprising a frame element arranged between the first and second partial regions, wherein the composite component includes the profile element, and wherein the profile element extends in a manner adjoining the frame element in a longitudinal direction and is clipped to the frame element.

2. The drive battery as claimed in claim 1, wherein the foam body extends in a manner adjoining the profile element in a longitudinal direction and is fastened to the profile element.

3. The drive battery as claimed in claim 2, wherein the foam body is adhesively bonded to the profile element.

4. The drive battery as claimed in claim 1, wherein the mat is fastened to the foam body and, proceeding from the foam body, extends across the one or more cell modules.

5. The drive battery as claimed in claim 4, wherein the mat is adhesively bonded to the foam body.

6. A motor vehicle comprising the drive battery as claimed in claim 1.

7. The drive battery as claimed in claim 1, wherein the mat is composed of silicone.

8. The drive battery as claimed in claim 1, wherein the hollow profile element is positioned above a wall of the housing.

9. The drive battery as claimed in claim 1, wherein the mat is mounted to a side wall of the foam body.

10. The drive battery as claimed in claim 9, wherein the hollow profile element is mounted to a bottom side of the foam body.

11. The drive battery as claimed in claim 1, wherein the mat extends over one cell module of the one or more cell modules.

12. The drive battery as claimed in claim 1, wherein the housing further comprises a frame member positioned between two cell modules of the one or more cell modules, and wherein the composite component is positioned atop the frame member.

13. The drive battery as claimed in claim 12, wherein the composite component is clipped to the frame member.

* * * * *